United States Patent [19]
Watanabe

[11] Patent Number: 5,436,728
[45] Date of Patent: Jul. 25, 1995

[54] LIGHT BEAM SCANNING SYSTEM WITH PHOTODETECTOR ORIENTED TO PREVENT UNWANTED REFLECTIONS

[75] Inventor: Hiroto Watanabe, Tokyo, Japan

[73] Assignee: Asahi Kogaku Kogyo Kabushiki Kaisha, Tokyo, Japan

[21] Appl. No.: 973,746

[22] Filed: Nov. 9, 1992

[30] Foreign Application Priority Data

Nov. 8, 1991 [JP] Japan .............. 3-109660 U

[51] Int. Cl.⁶ .......................................... G01N 21/84
[52] U.S. Cl. ................................ 356/431; 250/235
[58] Field of Search ............... 356/431; 250/235, 236; 359/216–219; 358/494

[56] References Cited

U.S. PATENT DOCUMENTS

| | | |
|---|---|---|
| 4,203,672 | 5/1980 | Smith, Jr. .......................... 250/235 |
| 4,761,659 | 8/1988 | Negishi . |
| 4,823,002 | 4/1989 | Saito . |
| 4,993,792 | 2/1991 | Minoura . |
| 5,001,341 | 3/1991 | Negishi . |
| 5,055,663 | 10/1991 | Morimoto et al. . |
| 5,066,987 | 11/1991 | Minefuju . |
| 5,084,616 | 1/1992 | Morimoto . |
| 5,087,813 | 2/1992 | Negishi . |
| 5,155,783 | 10/1992 | Suwashita . |
| 5,200,611 | 4/1993 | Hattori ............................. 250/235 |
| 5,264,911 | 11/1993 | Nakane et al. ...................... 356/218 |

*Primary Examiner*—Richard A. Rosenberger
*Assistant Examiner*—Robert H. Kim
*Attorney, Agent, or Firm*—Sandler, Greenblum & Bernstein

[57] ABSTRACT

A light beam scanning system for use as a laser beam scanner in a laser beam printer has a polygonal mirror for deflecting a light beam emitted from a laser diode to scan a photosensitive drum with a scanning light beam. The scanning light beam is reflected by a mirror to a photodetector. In response to the reflected scanning light beam, the photodetector produces an output signal which is processed into a horizontal scanning signal to determine the timing to start writing information on the photosensitive drum with the scanning light beam. The photodetector has a detecting surface for receiving the reflected scanning fight beam. The detecting surface is oriented to prevent reflections therefrom of the reflected scanning light beam from traveling back to the light beam source through the mirror and the polygonal mirror.

19 Claims, 3 Drawing Sheets

LIGHT BEAM SCANNING SYSTEM WITH PHOTODETECTOR ORIENTED TO PREVENT UNWANTED REFLECTIONS

BACKGROUND OF THE INVENTION

The present invention relates to a light beam scanning system such as a laser beam scanner for use in a laser beam printer or tile like, and more particularly to a photodetector for detecting a scanning beam in such a light beam scanning system.

Light beam scanning systems such as a laser beam scanner for use in a laser beam printer or the like include a scanning element such as a polygonal mirror for scanning a laser beam emitted from a laser beam source. The laser beam is modulated by information that is to be printed. The laser beam, after being scanned and reflected by the polygonal mirror, is applied to a photosensitive medium such as a photosensitive drum to write the information on the photosensitive drum. The output level of the laser beam is monitored, and fed back to the laser beam source, which controls the laser to maintain a constant laser beam output level.

The light beam scanning systems also have a photodetector for detecting the scanning laser beam at a starting end of the stroke of each of scanning cycle. Each time the scanning laser beam is applied to the photodetector, the photodetector produces an output signal, and a processing circuit connected to the photodetector compares the output signal with a threshold level, thereby generating a rectangular horizontal synchronizing signal. The scanning laser beam is controlled to start writing the information on time photosensitive drum based on the horizontal synchronizing signal.

In the conventional light beam scanning systems, the photodetector is directed such that the scanning laser beam falls perpendicularly to the photosensitive surface of the photodetector.

One problem with the conventional orientation of the photodetector is that since the scanning laser beam is applied perpendicularly to the photosensitive surface of time photodetector, the reflection of the scanning laser beam from the photosensitive surface returns to the laser beam source, tending to impair the adjustment of the output level of the laser beam emitted from the laser beam source.

According to another drawback, the laser beam reflection may possibly be diffused by the photosensitive surface of the photodetector. When the diffused laser beam reaches the photosensitive drum, it may develop a ghost in the electrostatic latent image formed on the photosensitive drum.

The photosensitive surface of the photodetector has a transparent insulating film and a slit film thereon. If the photodetector is installed with an error, i.e., if the photosensitive surface is oriented improperly, then the transparent insulating film or the slit film reflects and diffuses the scanning laser beam. When the scanning laser beam is thus reflected and diffused, the photodetector generates an output signal which contains a waveform distortion N as shown in FIG. 1 of the accompanying drawings. The signal distortion N is liable to adversely affect the detection of the timing to start writing the information on the photosensitive drum.

Summary of the Invention

It is therefore an object of the present invention to provide a light beam scanning system having a photodetector which is oriented to allow the output level of a scanning beam to be adjusted properly without fail.

Another object of the present invention is to provide a light beam scanning system having a photodetector which can produce a stable output signal free of waveform distortions for accurately detecting the timing to start writing information on a photosensitive medium associated with the beam scanning system.

Still another object of the present invention is to provide a light beam scanning system having a photodetector which is directed to prevent a ghost from being produced in an electrostatic latent image formed on a photosensitive medium associated with the beam scanning system.

To achieve the above objects, according to a first aspect of the present invention, there is provided a light beam scanning system which comprises scanning means for scanning an objective surface with a scanning light beam; and a photodetector responsive to the scanning light beam applied thereto for producing a signal to control said scanning light beam, wherein said photodetector has a detecting surface for receiving the scanning light beam, and said detecting surface is oriented such that a line perpendicular to said detecting surface is inclined to the scanning light beam applied thereto.

According to a second aspect of the present invention, there is provided a light beam scanning system which comprises a light beam source for emitting a light beam; scanning means for deflecting said light beam to scan an objective surface with a scanning light beam; mirror means for reflecting said scanning light beam; and a photodetector responsive to the reflected scanning light beam for producing a signal to control said light beam, wherein said photodetector has a detecting surface for receiving said reflected scanning light beam, and said detecting surface is oriented to prevent reflections therefrom of said reflected scanning light beam from traveling back to said light beam source through said mirror means and said scanning means.

According to a third aspect of the present invention, there is provided a light beam scanning system which comprises scanning means for scanning an objective surface with a scanning light beam; and a photodetector responsive to the scanning light beam applied thereto for producing a signal to control said scanning light beam, wherein said photodetector has a detecting surface for receiving said reflected scanning light beam, and said detecting surface is oriented to prevent reflections therefrom of said reflected scanning light beam from traveling back through said scanning means to a light beam source for emitting said light beam.

According to a fourth aspect of the present invention, there is provided a light beam scanning system which comprises a light beam source for emitting a light beam; scanning means for deflecting said light beam to scan an objective surface with a scanning light beam; mirror means for reflecting said scanning light beam; and a photodetector responsive to the reflected scanning light beam For producing a signal to control said light beam, wherein said photodetector has a detecting surface for receiving the scanning light beam, and said detecting surface is oriented such that a line perpendicular to said detecting surface is inclined to the scanning light beam applied thereto.

The above, and other objects, features and advantages of the present invention will become apparent from the following detailed description which is to be read in conjunction with the accompanying drawings.

DESCRIPTION OF THE ACCOMPANYING DRAWINGS

DESCRIPTION OF THE EMBODIMENT

Figure 1:
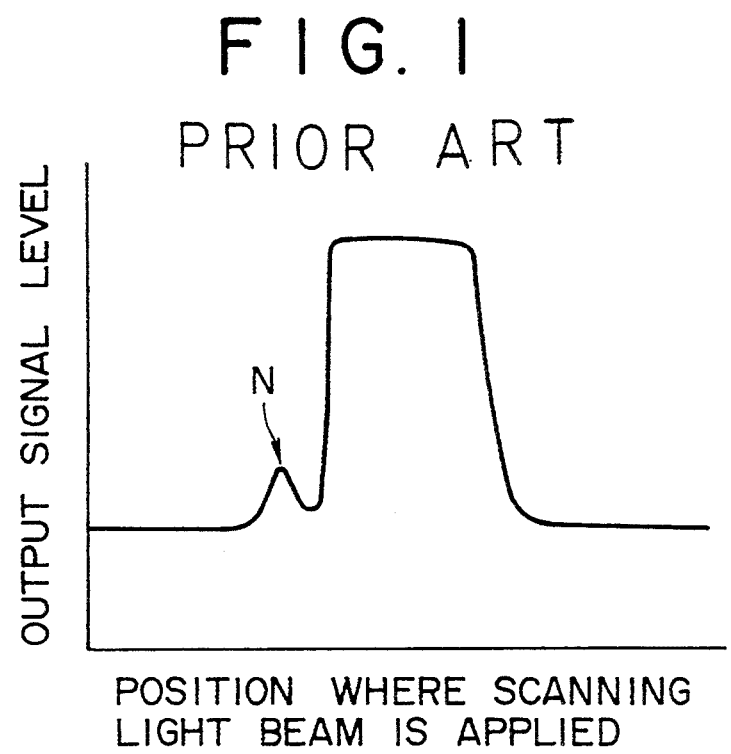
FIG. 1 is a diagram showing a waveform distortion contained in an output signal generated by a photodetector in a conventional light beam scanning system.
Figure 2:
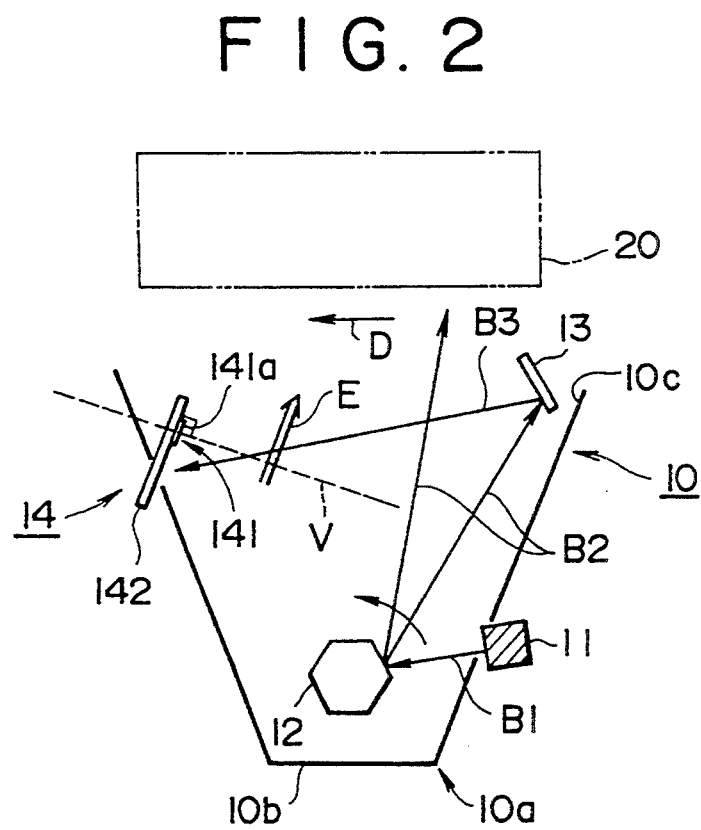
FIG. 2 is a schematic view of a light beam scanning system with a photodetector, of one embodiment according to the present invention.

As shown in FIG. 2, a light beam scanning system 10 of one embodiment according to the present invention is in the form of a laser beam scanner for use in a laser beam printer, for example. The laser beam printer includes a photosensitive drum 20 which forms an electrostatic latent image thereon when scanned by a scanning laser beam according to the known principles of electrophotography.

The light beam scanning system 10 applies a scanning laser beam bearing Information to be printed to the photosensitive drum 20 for forming an electrostatic latent Image thereon.

The light beam scanning system 10 has a laser diode 11 for emitting a laser beam B1, a polygonal mirror 12 for reflecting and deflecting the laser beam B1 emitted from the laser diode 11 into a scanning laser beam B2 which moves in a main scanning direction indicated by the arrow D, a reflecting mirror 13 for reflecting the scanning laser beam B2 at a starting end of the stroke of each scanning cycle into a scanning laser beam B3 that is translated in the direction indicated by the arrow E, and a horizontal synchronization detector 14 for generating a horizontal synchronizing signal to determine a position to start writing Information on the photosensitive drum 20.

The light beam scanning system 10 has a casing 10a having a closed bottom 10b positioned away from the photosensitive drum 20 and an opening 10c opening toward the photosensitive drum 20. The laser beam source 12 is positioned within the casing 10a near the bottom 10b. The reflecting mirror 13 is located in the opening 10c near one side thereof. The horizontal synchronization detector 14 is disposed in the opening 10c near an opposite side thereof.

The horizontal synchronization detector 14 includes a photodetector 141 comprising a photo-diode or the like which has a photosensitive surface 141a for receiving the scanning laser beam. The horizontal synchronization detector further includes processing circuit 142 for comparing an output signal generated by the photodetector 141 in response to the application of the scanning laser beam B3 to the photosensitive surface 141a, with a threshold level to produce the horizontal synchronizing signal.

Figure 3:
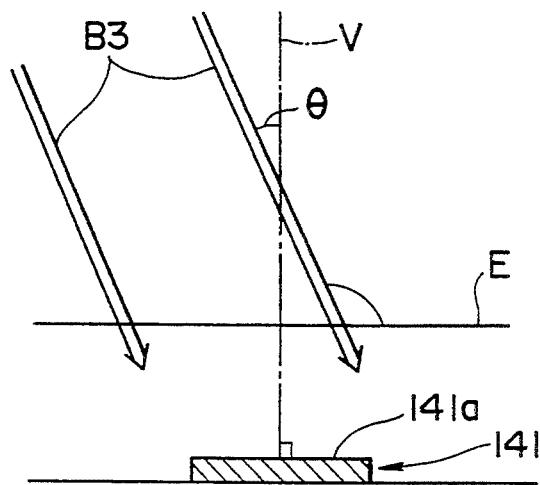
FIG. 3 is an enlarged view showing the relationship between the photosensitive surface of the photodetector shown in FIG. 2, a line perpendicular to the photosensitive surface, and a scanning laser beam applied to the photosensitive surface.

As shown in FIG. 3, the photosensitive surface 141a of the photodetector 141 is oriented such that a line V perpendicular to the photosensitive surface 141a is inclined at an angle $\theta$ to the scanning laser beam B3 falling on the photosensitive surface 141a toward the starting end of a scanning stroke through which the scanning laser beam B3 scans the photosensitive surface 141a in the direction E. Stated otherwise, the photosensitive surface 141a is directed away from the photosensitive drum 20 so as not to reflect the scanning laser beam B3 toward the photosensitive drum 20.

The photodetector 141 has a transparent insulating film (not shown) and a slit film (not shown) on the photosensitive surface 141a. The slit film has a slit that defines an area in which the scanning laser beam B3 is applied to the photosensitive surface 141a, so that the horizontal synchronizing signal generated by the processing circuit 142 has a stable waveform and a predetermined duration.

Figure 4:
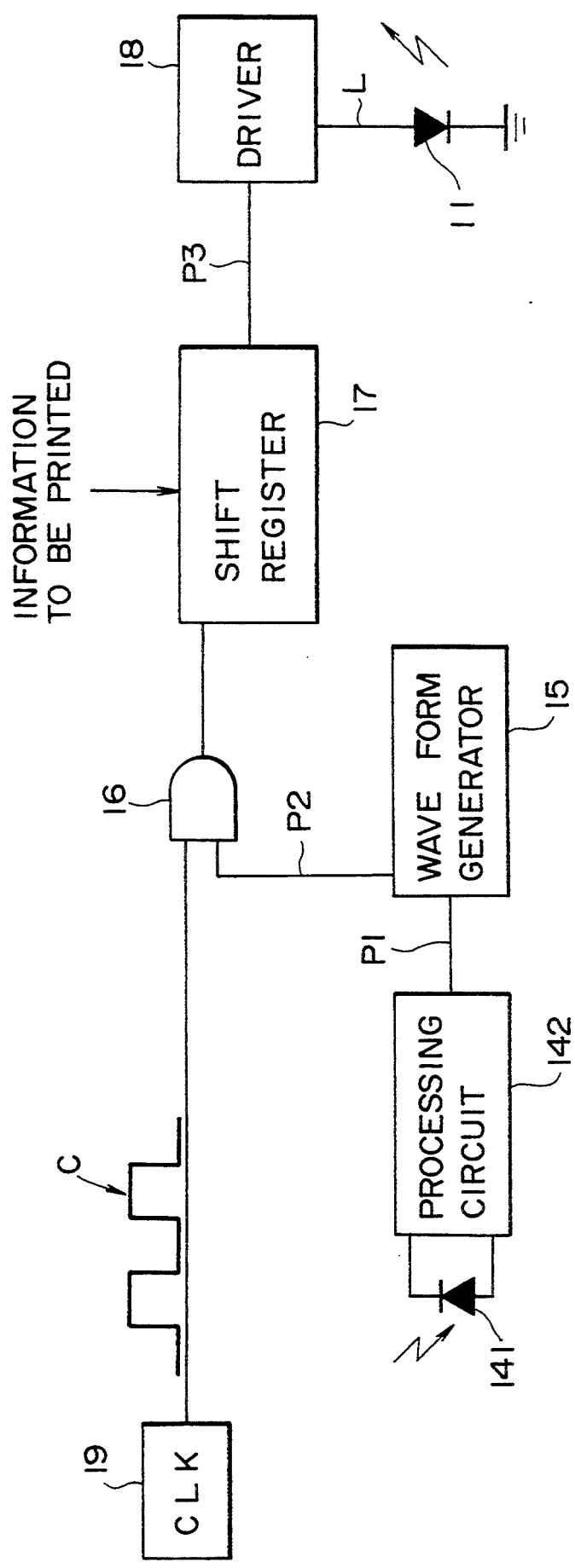
FIG. 4 is a block diagram of a control system of the light scanning system shown in FIG. 2, the control system including a laser beam source and the photodetector.

As shown in FIG. 4, the light beam scanning system 10 has a control system comprising a waveform generator 15 for receiving the horizontal synchronizing signal from the processing circuit 142, an AND gate 16 for receiving an output signal from the waveform generator 15 and a clock signal from a clock generator 19, a shift register 17 for latching one line of information to be printed, in the main scanning direction D, supplied from an external device such as a computer, a word processor, or the like, based on an output signal from the AND gate 16, and a driver 18 for controlling the laser diode 11 for laser beam emission based on the information from the shift register 17.

The driver 18 monitors the output level of the laser beam B1, and maintains a constant laser beam output level under feedback control.

Figure 5:
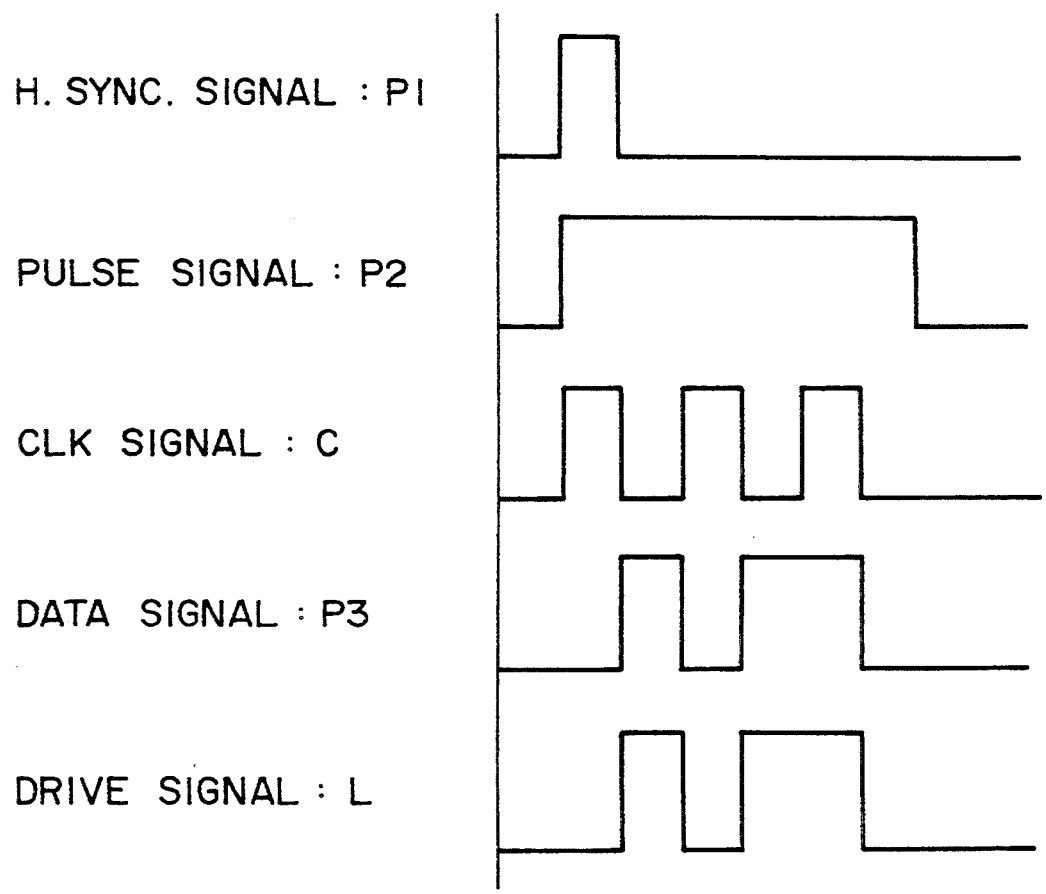
FIG. 5 is a timing chart of signals generated by various components of the control system shown in FIG. 4.

FIG. 5 shows the waveforms of output signals produced by the processing circuit 142, the waveform generator 15, the clock generator 19, the shift register 17, and the driver 18. More specifically, the processing circuit 142 applies a horizontal synchronizing signal P1 to the waveform generator 15. In synchronism with a positive-going edge of the horizontal synchronizing signal P1, the waveform generator 15 supplies a pulse signal P2 to one input terminal of the AND gate 16, whose other input terminal is supplied with a clock signal C from the clock generator 19. Therefore, the AND gate 16 applies the clock signal C to the shift register 17 while the pulse signal P2 from the waveform generator 15 is at the high level.

In synchronism with the clock signal C, the shift register 17 supplies the driver 18 with the latched line of information as a data signal P3. The driver 18 then applies a drive signal L, which Is of the same waveform as the data signal P3, to the laser diode 11.

While the drive signal L is at the high level, the laser diode 11 is energized to emit the laser beam B1. The laser beam B1 is reflected and deflected by the polygonal mirror 12 into the scanning laser beam B2 which is then applied to scan the photosensitive drum 20 in the main scanning direction D. At the same time, the photosensitive drum 20 is rotated about its own axis. Therefore, a two-dimensional electrostatic latent image represented by the data signal P3 from the shift register 17 is formed on the photosensitive drum 20.

As shown in FIG. 3, the photosensitive surface 141a of the photodetector 141 is oriented such that the line V perpendicular to the photosensitive surface 141a is inclined at the angle $\theta$ to the scanning laser beam B3 toward the starting end of the scanning stroke of the scanning laser beam B3 in the direction E. Therefore, reflections of the scanning laser beam B3 from the photosensitive surface 141a are prevented from traveling back to the laser diode 11. Since no reflected scanning laser beam is applied to the laser diode 11, the laser beam B1 emitted from the laser diode 11 can be properly adjusted to a constant output level by the driver 18 without fail.

The above orientation of the photosensitive surface 141a also prevents any reflection or diffusion by the transparent Insulating film or the slit film of the applied scanning laser beam B3 from adversely affecting the output signal from the photodetector 141. Therefore, the output signal from the photodetector 141 is free from distortions particularly at its positive-going edge. The output signal generated by the photodetector 141 is thus highly stable in waveform, permitting the processing circuit 142 to detect accurately the timing to start writing the information on the photosensitive drum 20 with the scanning laser beam B2.

The scanning laser beam B3 is inclined to the line V, i.e., the photosensitive surface 141a in the manner described above. That is, the photosensitive surface 141a faces away from the photosensitive drum 20. As a consequence, the reflection of the scanning laser beam B3 from the photosensitive surface 141a is directed away from the photosensitive drum 20 and hence does not fall on the photosensitive drum 20. Therefore, while the scanning laser beam B3 is moving in the direction E. no ghost is produced in the electrostatic latent image formed on the photosensitive drum 20, and hence the electrostatic latent image formed on the photosensitive drum 20 is high in quality.

The present disclosure relates to a subject matter contained in Japanese Utility Model Application No. HEI 3-109660, filed on Nov. 8, 1991, which is expressly incorporated herein by reference in its entirety.

What is claimed is:

1. A light beam scanning system, comprising:
scanning means for scanning an objective surface with a scanning light beam;
a reflecting mirror for reflecting the scanning light in a direction away from said objective surface, wherein said reflecting mirror is located outside of an area swept by the scanning light beam when scanning said objective;
a photodetector responsive to the scanning light beam reflected by said reflecting mirror and applied thereto for producing a signal to control said scanning light beam, wherein said photodetector is located outside of an area swept by the scanning light beam when scanning said objective,
said photodetector having a detecting surface for receiving said reflected scanning light beam, wherein said detecting surface faces away from said objective surface, thereby preventing incidence of light reflected by said objective surface onto said photodetector; and
said detecting surface further being oriented such that a line perpendicular to said detecting surface is inclined to said scanning light beam applied thereto.

2. The system according to claim 1, wherein
said scanning means scans said detecting surface with said scanning light beam through a scanning stroke which extends in one predetermined direction, and said line perpendicular to said detecting surface is inclined to said scanning light beam toward a starting end of said scanning stroke in said one predetermined direction.

3. The system according to claim 2, wherein
said scanning means comprises a mirror for reflecting said scanning light beam toward said detecting surface.

4. The system according to claim 2, wherein
said one predetermined direction comprises a main scanning direction.

5. The system according to claim 1, wherein said detecting surface of said photodetector and said reflecting mirror face substantially opposite each other.

6. A light beam scanning system, comprising:
a light beam source for emitting a light beam;
scanning means for deflecting said light beam to scan an objective surface with a scanning light beam;
mirror means for reflecting said scanning light beam in a direction away from said objective surface; and
a photodetector responsive to the reflected scanning light beam for producing a signal to control said light beam,
said photodetector having a detecting surface for receiving said reflected scanning light beam, wherein said detecting surface faces away from said objective surface, thereby preventing incidence of light reflected by said objective surface onto said photodetector, and
said detecting surface further being oriented to prevent reflections therefrom of said reflected scanning light beam from traveling back to said light beam source through said mirror means and said scanning means.

7. The system according to claim 6, wherein
said detecting surface is oriented such that a line perpendicular to said detecting surface is inclined to said reflected scanning light beam applied thereto from said mirror means.

8. The system according to claim 6, wherein said mirror means comprises a reflective surface for reflecting the scanning light beam and said reflective surface faces away from said objective surface.

9. The system according to claim 8, wherein said detecting surface of said photodetector and said reflective surface of said mirror means face substantially opposite each other.

10. The system according to claim 6, wherein said mirror means is located outside of an area swept by the scanning light beam when the scanning light beam scans said objective surface.

11. The system according to claim 6, wherein said detecting surface of said photodetector is located outside of an area swept by the scanning light beam when the scanning light beam scans said objective surface.

12. A light beam scanning system comprising:
scanning means for scanning an objective surface with a scanning light beam;
a reflector for reflecting the scanning light beam in a direction away from said objective surface; and
a photodetector responsive to said scanning light beam reflected by said reflector and applied thereto for producing a signal to control said scanning light beam,
said photodetector having a detecting surface for receiving said reflected scanning light beam, wherein said detecting surface faces away from said objective surface, thereby preventing incidence of light reflected by said objective surface onto said photodetector, and said detecting surface further being oriented to prevent reflections therefrom of said reflected scanning light beam from traveling back through said scanning means to a light beam source for emitting said light beam.

13. The system according to claim 12, wherein said detecting surface is oriented such that a line perpendicular to said detecting surface is inclined to said reflected scanning light beam applied thereto.

14. The system according to claim 12, wherein said reflector faces away from said objective surface, and said reflector and said detecting surface of said photodetector face substantially opposite each other.

15. A light beam scanning system, comprising:

a light beam source for emitting a light beam;

scanning means for deflecting said light beam to scan an objective surface with a scanning light beam;

mirror means for reflecting said scanning light beam in a direction away from said objective surface; and a photodetector responsive to the reflected scanning light beam for producing a signal to control said light beam, said photodetector having a detecting surface for receiving said reflected scanning light beam, wherein said detecting surface faces away from said objective surface, thereby preventing incidence of light reflected by said objective surface onto said photodetector, and said detecting surface further being oriented such that a line perpendicular to said detecting surface is inclined to the scanning light beam applied thereto.

16. The system according to claim 15, wherein said scanning means scans said detecting surface with said scanning light beam through a scanning stroke in one predetermined direction, and said line perpendicular to said detecting surface is inclined to said scanning light beam toward a starting end of said scanning stroke in said one predetermined direction.

17. The system according to claim 16, wherein said scanning means Includes a mirror for reflecting said scanning light beam toward said detecting surface.

18. The system according to claim 16, wherein said one predetermined direction comprises a main scanning direction.

19. The system according to claim 15, wherein mirror means faces away from said objective surface, and said mirror means and said detecting surface of said photodetector face substantially opposite each other.

* * * * *

UNITED STATES PATENT AND TRADEMARK OFFICE
CERTIFICATE OF CORRECTION

PATENT NO. : 5,436,728
DATED : July 25, 1995
INVENTOR(S) : H. WATANABE

It is certified that error appears in the above-indentified patent and that said Letters Patent is hereby corrected as shown below:

Title page, in section [56], "References Cited", "U.S. PATENT DOCUMENTS", line 7, change "Minefuju" to ---Minefuji---.

At column 8, line 17 (claim 17, line 2), change "Includes" to ---includes---.

Signed and Sealed this

Seventeenth Day of December, 1996

Attest:

BRUCE LEHMAN

Attesting Officer

Commissioner of Patents and Trademarks